United States Patent
Hagenmeyer et al.

(10) Patent No.: US 6,397,683 B1
(45) Date of Patent: Jun. 4, 2002

(54) CLAMP-ON ULTRASONIC FLOWMETER

(76) Inventors: Heinerich Hagenmeyer, Heideggerstrasse 4 c, D-79639 Grenzach-Whylen; Peter Schwarzenberger, Lange Feldstrasse 75, D-30926 Seelze, both of (DE); Thiérry Moser, 6 Rue Mühlweg, F-68510 Sierentz (FR); Marcel von Arx, Allmendstrasse 26, CH-4206 Seewen; Walter Kamber, In den Matten 6 CH-4457, Dietgen, both of (CH); Sergej Lopatin, Freiburger Strasse 321 A, D-79539 Lörrach (DE)

( * ) Notice: Subject to any disclaimer, the term of this patent is extended or adjusted under 35 U.S.C. 154(b) by 0 days.

(21) Appl. No.: 09/356,937

(22) Filed: Jul. 19, 1999

Related U.S. Application Data
(60) Provisional application No. 60/106,835, filed on Nov. 3, 1998.

Foreign Application Priority Data
Jul. 22, 1998 (EP) .............................................. 98113670

(51) Int. Cl.$^7$ ................................................. G01F 1/20
(52) U.S. Cl. .................................. 73/861.18; 73/861.27
(58) Field of Search .......................... 73/866.5, 861.18, 73/861.27, 861.28, 861.29; 156/91; 248/230.8, 230.9, 74.3, 74.1

(56) References Cited

U.S. PATENT DOCUMENTS

| | | |
|---|---|---|
| 3,869,915 A | 3/1975 | Baumoel |
| 4,738,737 A | 4/1988 | Runde et al. |
| 4,858,470 A | 8/1989 | Kincaid et al. |
| 4,948,552 A | 8/1990 | Mollot et al. |
| 5,131,278 A | 7/1992 | Baumoel |

*Primary Examiner*—Benjamin R. Fuller
*Assistant Examiner*—Corey D. Mack
(74) *Attorney, Agent, or Firm*—Bose McKinney & Evans LLP (57) ABSTRACT

An improved clamp-on arrangement having a first sensor assembly (2, 2') and a second sensor assembly (3, 3') usable for different nominal diameters of pipes. The sensor assemblies can be positioned either along a single straight surface line (11) or along diametrically opposed straight surface lines (11', 11") of the pipe. The arrangement contains replaceable components, so that in the event of a malfunction, only faulty components need to be replaced. The assemblies (2, 2'; 3, 3') are attached by means of pipe straps (4, 4'); (5, 5') and wherein the assemblies are identical in construction. Each assembly has a flat bracket (6) adjacent to the pipe and having a longitudinal center line (61) and a tubular portion (62) integrally formed thereon. A sensor inset (63) is longitudinally guided in the tubular portion (62) and contains an ultrasonic transducer (64) with a transducer element (644). A sensor cap (65) is put over the tubular portion (62), is secured thereto by means of a snap fastener (67) releasable by rotation, and is provided with a spring (66) which forces the inset (63) against the pipe. A strap-tightening device (70) is fixed in the bracket approximately in the middle of the longitudinal center axis (61).

8 Claims, 10 Drawing Sheets

CLAMP-ON ULTRASONIC FLOWMETER

This Appln claims benefit of Prov. No. 60/106,835 filed Nov. 3, 1998.

FIELD OF THE INVENTION

This invention concerns the provision of clamp-on ultrasonic flowmeters.

BACKGROUND OF THE INVENTION

Such ultrasonic flowmeters, as is well known, are secured to the outside of a pipe, particularly of a pipe already permanently installed within a pipe system, without the need for any modification af the pipe, e.g., for making a hole therein. They also require no specially prepared measuring tube as is necessary in flowmeters based on other measuring principles, such as in vortex flowmeters, electromagnetic flowmeters, or Coriolis mass flowmeters.

U.S. Pat. No. 3,869,915 describes a clamp-on ultrasonic flowmeter with a sensor assembly comprising two sensors which are spaced along a straight surface line of a pipe conducting a fluid to be measured and are secured to the pipe by means of first and second pipe straps, respectively.

In the single FIGURE of U.S. Pat. No. 4,738,737, but not in the pertinent description, a clamp-on ultrasonic flowmeter is disclosed comprising a first sensor assembly and a second sensor assembly, the first being attached on a first straight surface line of a pipe by means of first and second pipe straps, and the second being attached at a given distance from the first on a second straight surface line essentially opposite to the first straight surface line by means of third and fourth pipe straps, the two sensor assemblies being identical in construction.

The last-mentioned U.S. Patent does not describe how the two sensor assemblies, if they are located on opposite straight surface lines, were aligned with respect to each other or how the two sensor assemblies have to be positioned at a distance from each other along a single straight surface line.

SUMMARY OF THE INVENTION

It is an object of the invention to provide an improved clamp-on ultrasonic flowmeter comprising two sensor assemblies which is usable for different nominal diameters of pipes and can be positioned either along a single straight surface line or along diametrically opposed straight surface lines.

Furthermore, the clamp-on ultrasonic flowmeter is to be so designed that it contains replaceable components, so that in the event of a malfunction, only faulty components need to be replaced.

To attain these objects, the invention provides a clamp-on ultrasonic flowmeter comprising a first sensor assembly and a second sensor assembly which are positioned at a given distance from each other
either along one straight surface line of a pipe conducting a fluid to be measured
or along a first straight surface line of the pipe and a diametrically opposed, second straight surface line, respectively, and attached by means of a first pipe strap and a second pipe strap, respectively, and which are identical in construction and each comprise:

a flat bracket adjacent to the pipe and having a longitudinal center line and a tubular portion integrally formed thereon;

a sensor inset longitudinally guided in the tubular portion and containing an ultrasonic transducer with a transducer element;

a sensor cap which is put over the tubular portion, is secured to the tubular portion by means of a snap fastening releasable by rotation, and comprises a spring which forces the sensor inset against the pipe; and a strap-tightening device fixed in the bracket approximately in the middle of the longitudinal center axis thereof and having an axis.

In a first preferred embodiment of the invention, the sensor inset ends in a cable pipe, and the sensor cap is rotatably mounted on the cable pipe.

In a second preferred embodiment of the invention, which can also be used with the first preferred embodiment, the strap-tightening device comprises:

a spiral spring;

a spring housing mounted in the bracket on the longitudinal center axis thereof by means of a threaded neck having a central hole;

a tightener having a first end serving as a strap guide through which the strap runs, and a second end designed as a threaded stud; and a nut rotatable in the spring housing and screwed onto the threaded stud for tightening the strap.

In a third preferred embodiment of the invention, which can also be used with the first or second preferred embodiment, at least one series circuit consisting of an air-core coil and at least one resistor is disposed within the sensor inset near the ultrasonic transducer, and is connected in parallel with the transducer element.

An essential advantage of the invention is that it provides a clamp-on ultrasonic flowmeter which meets all assembly, adjustment, and repair requirements.

BRIEF DESCRIPTION OF THE DRAWINGS

The invention will become more apparent from the following description of preferred embodiments when taken in conjunction with the accompanying drawings, in which.

DETAILED DESCRIPTION OF PREFERRED EMBODIMENTS

Figure 1:
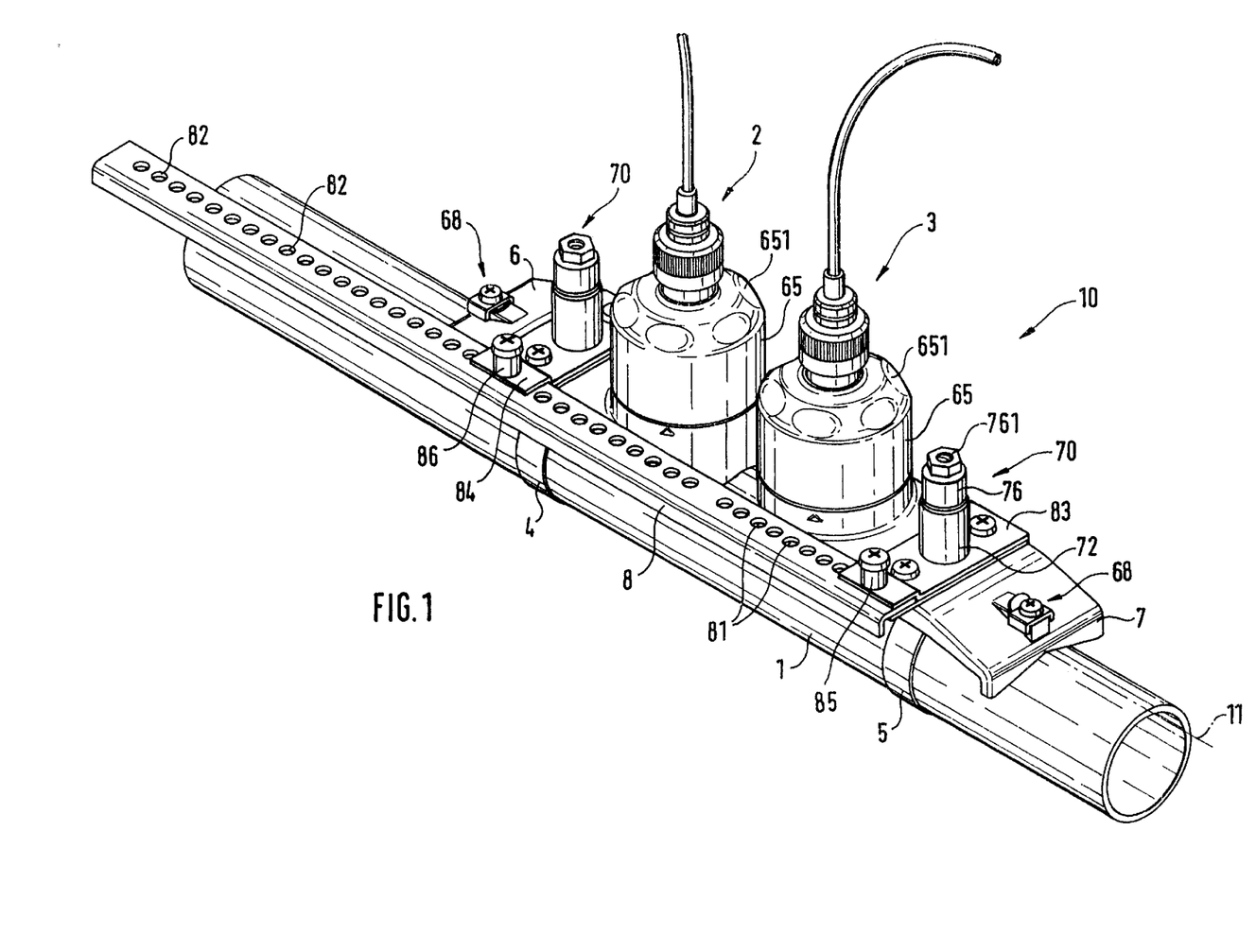
FIG. 1 is a perspective view of a first variant of a clamp-on ultrasonic flowmeter with sensor assemblies fixed to a pipe along one straight surface line of the pipe.

FIG. 1 is a perspective view of a first variant of a clamp-on ultrasonic flowmeter 10. The clamp-on flowmeter 10 has already been attached to a pipe 1 in which flows a fluid whose flow velocity and/or volumetric flow rate are to be measured. The fluid is a liquid, a gas, or a vapor; the liquid may also contain solids.

The clamp-on flowmeter 10 comprises a first sensor assembly 2 and a second sensor assembly 3. These are attached along a straight surface line 11 of the pipe 1 at a distance from and mirror-symmetrically with respect to each other by means of first and second straps 4 and 5, respectively, which embrace the pipe. The two sensor assemblies 2 and 3 comprise a first bracket 6 and a second bracket 7, respectively.

Each of the straps 4, 5 is fitted with a separate releasable catch which is located on the back of the pipe 1 and is therefore not shown. With these catches, the straps 4, 5, and thus the respective sensor assemblies 2, 3, are prestrapped onto the pipe 1 such that the straps are still movable in an axial direction of the pipe 1.

FIG. 1 further shows an aid for positioning the two sensor assemblies 2, 3 at an optimum distance from each other. A perforated bar 8 with first and second rows of holes 81, 82 can be temporarily or permanently attached at the sides of the two sensor assemblies 2, 3 by means of first and second cover plates 83, 84.

A first screw 85 extends into one hole of the first row of holes 81, and a second screw 86 extends into one hole of the second row of holes 82. As the pitch of the row of holes 81 is different from that of the row of holes 82— for example, the row 81 has a nine-hole pitch and the row 82 a ten-hole pitch—, a very precise adjustment of the distance between the sensor assemblies 2, 3 is possible by moving the perforated bar 81 relative to the cover plates 83, 84, and thus one sensor assembly relative to the other.

Figure 2:
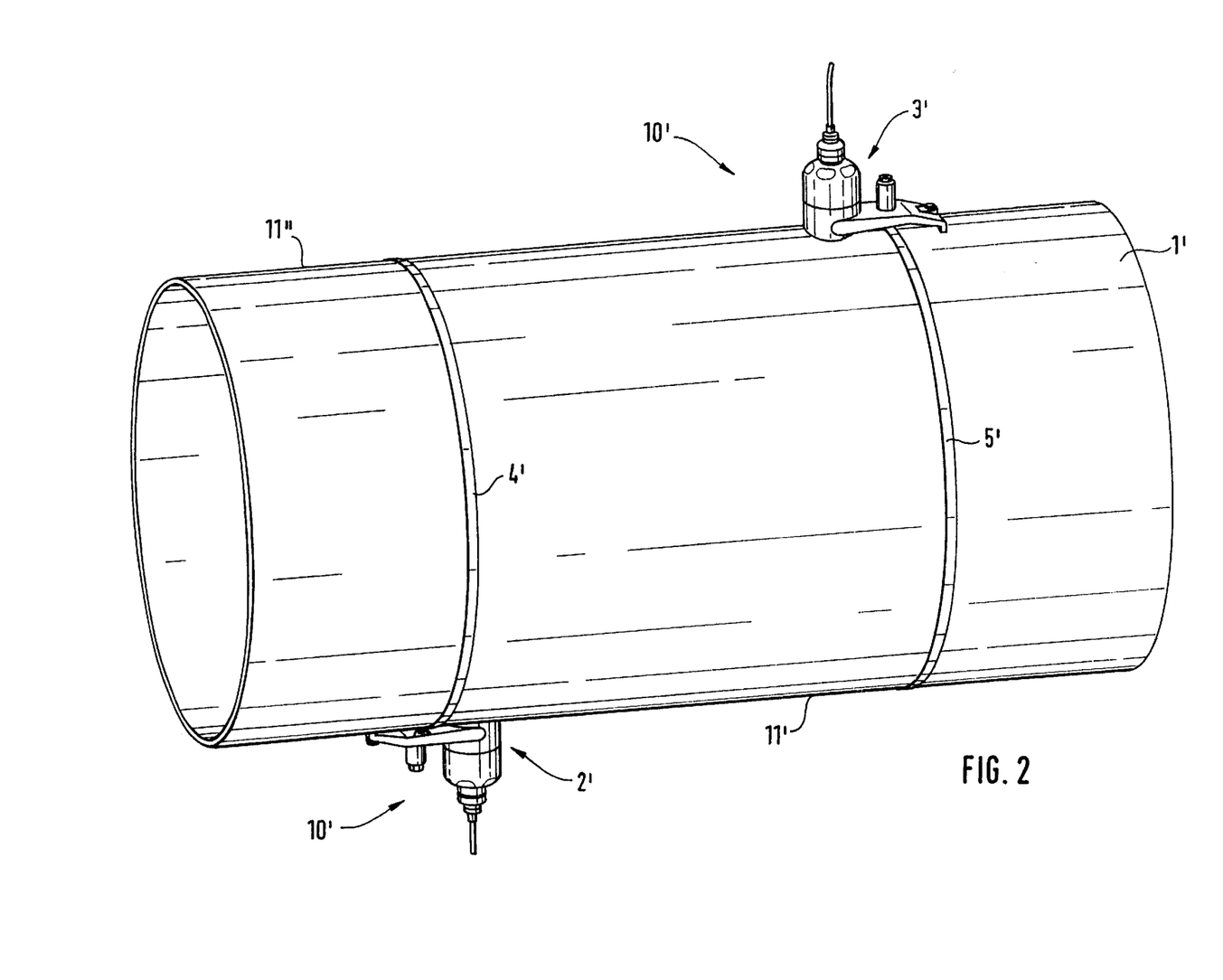
FIG. 2 is a perspective view of a second variant of a clamp-on ultrasonic flowmeter with sensor assemblies fixed to a pipe along diametrically opposed straight surface lines of the pipe.

FIG. 2 is a perspective view of a second variant of a clamp-on flowmeter 10' which has already been secured to a pipe 1'. It comprises sensor assemblies 2', 3' fixed along diametrically opposed straight surface lines 11', 11" of the pipe 1'. Compared with the arrangement of FIG. 1, the diameter of pipe 1' is substantially greater than the diameter of pipe 1. Therefore, the sensor assemblies 2', 3' are shown smaller than the sensor assemblies 2, 3 of FIG. 1 although the respective assemblies are identical.

The sensor assemblies 2' and 3' are attached by means of straps 4' and 5', respectively, as described in connection with FIG. 1.

Figures 3, 4:
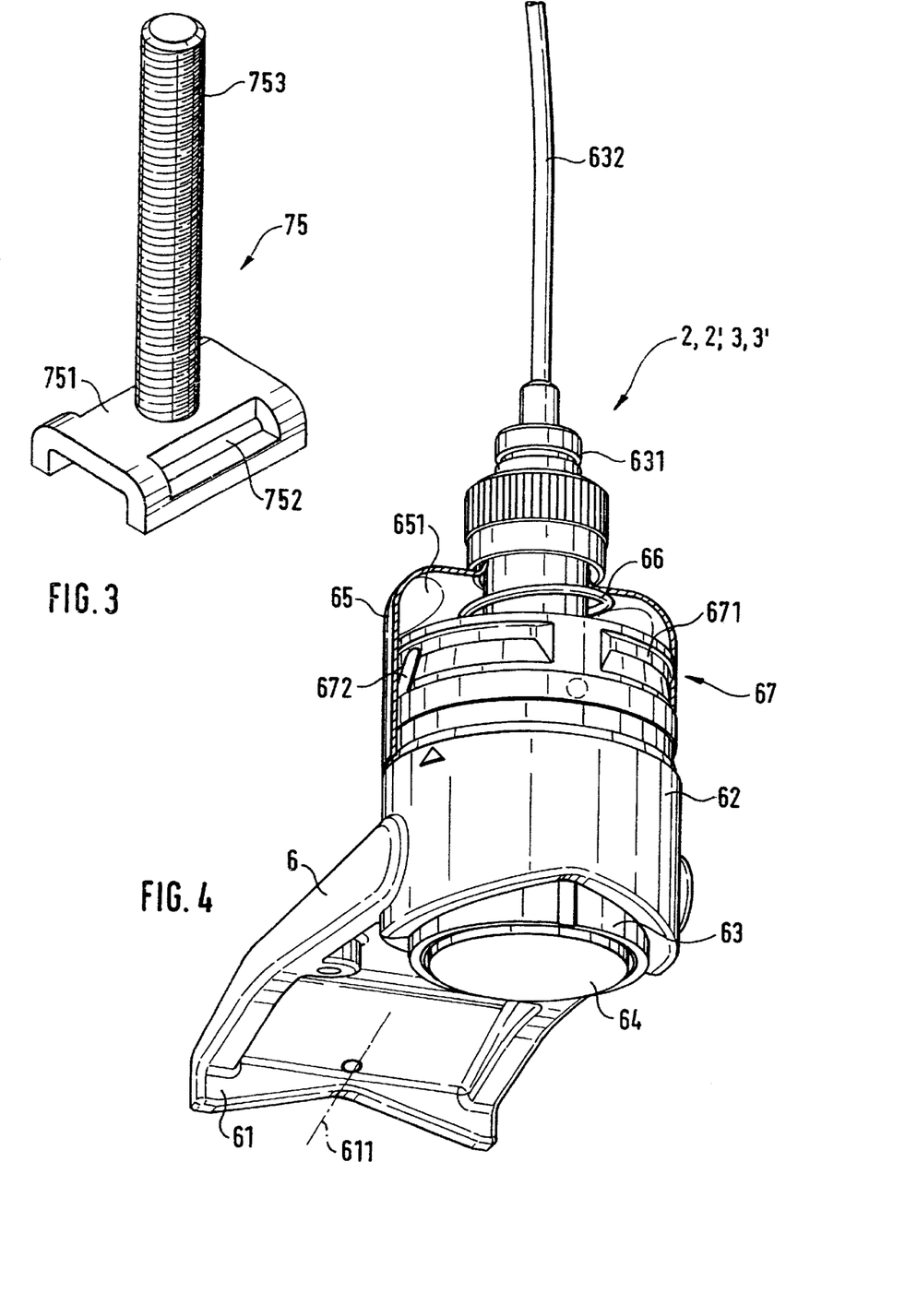
FIG. 3 is a perspective view of a tightener forming part of a strap-tightening device as used in the invention.
FIG. 4 is a perspective cutaway view showing the construction of a sensor assembly forming part of the invention.

FIG. 3 is a perspective view of a tightener 75 having a first end 751. The latter has a bore 752 which is adapted to the cross section of the strap 4, 4' and serves as a guide through which the strap runs. The tightener 75 further has a threaded stud 753, which represents a second end.

Figure 5:
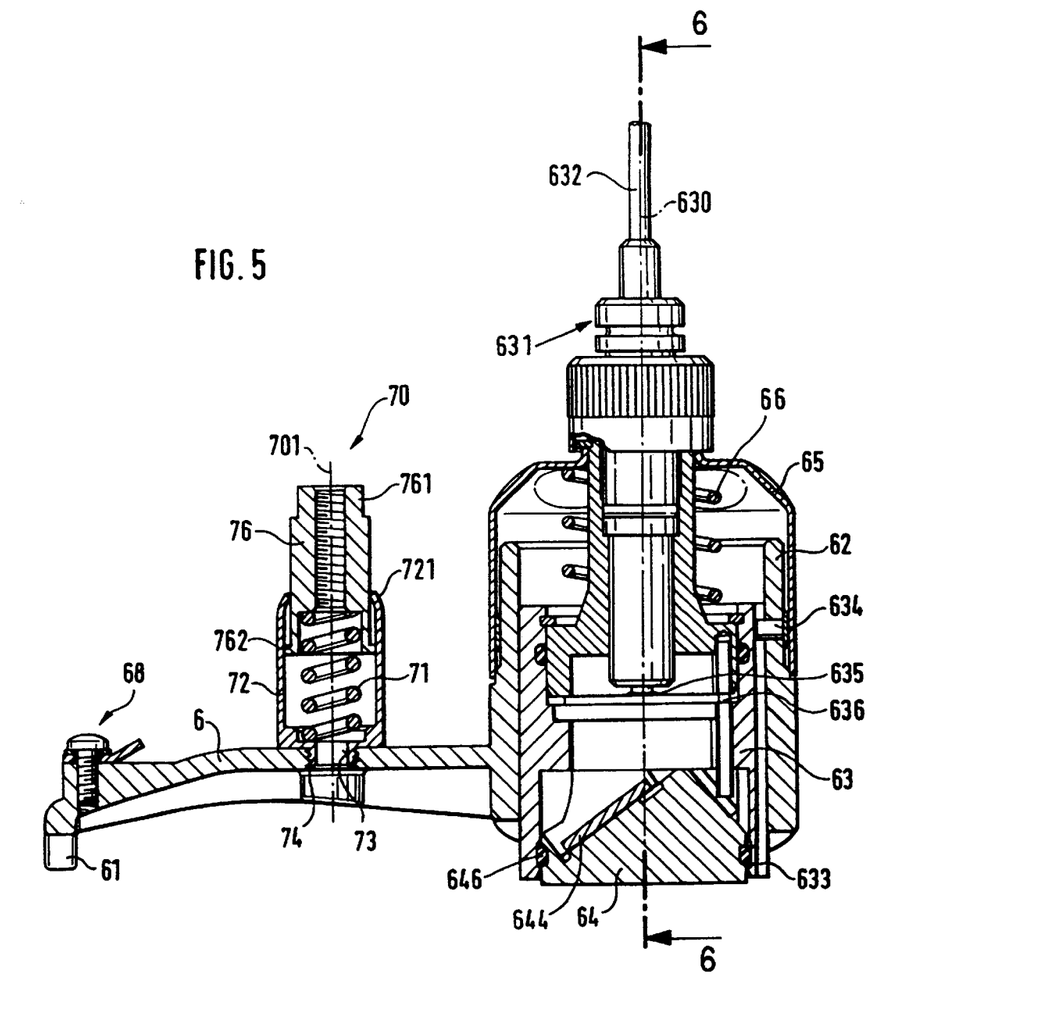
FIG. 5 is a longitudinal section taken along a center line of the bracket of a preferred embodiment of the sensor assembly of FIG. 4.
Figure 6:
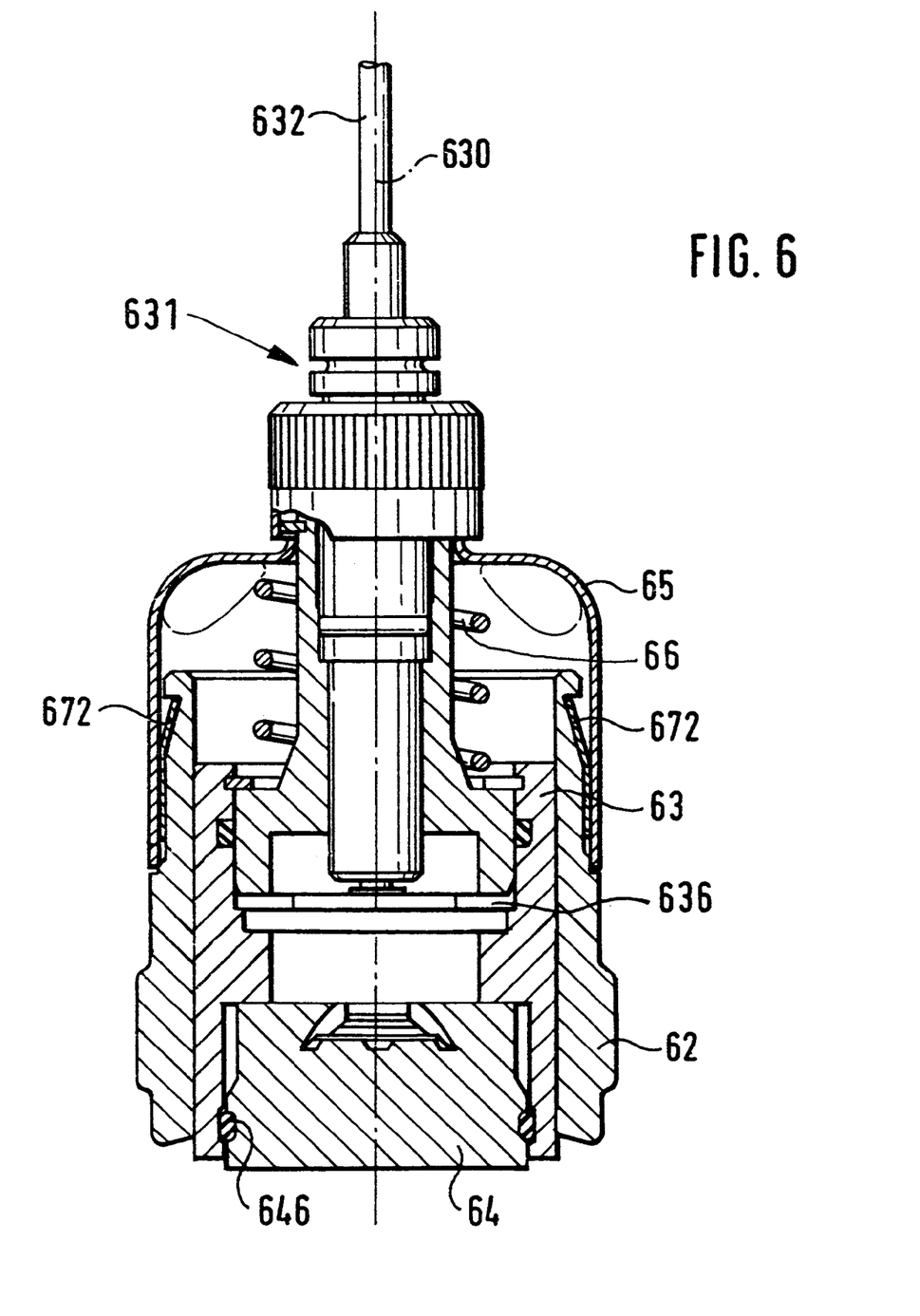
FIG. 6 is a section taken along line C—C of FIG. 5.

In FIG. 4, the construction of the sensor assembly 2, 2'; 3, 3', which forms part of the invention, is shown in a perspective cutaway view. FIG. 5 is a section taken along a center line of the bracket, and FIG. 6 is a section taken along line C—C of FIG. 5. FIGS. 4 to 6 will therefore be explained together.

The flat bracket 6, which is adjacent to the pipe, has a central longitudinal axis 611 and a tubular portion 62 integrally formed thereon. At an end remote from the tubular portion 62, the bracket 6 rests on the pipe 1, 1'. To establish two points of contact with the pipe, the end 61 is not plane but forms a slight angle.

In the tubular portion 62, a sensor inset 63 longitudinally guided in a groove 633 by a nose 634 can be moved back and forth against the action of a spring 66, particularly a spiral spring. The sensor inset 63 has a vertical axis 630, contains an ultrasonic transducer 64, and, in the strapped-on condition as shown in FIGS. 1 and 2, is forced against the pipe 1, 1' by the spring 66.

A sensor cap 65 has been put on the tubular portion 62 and secured to the latter by means of a snap fastening 67, which is releasable by rotation. The sensor inset 63 preferably ends in a cable pipe 631 for a connecting cable 632, on which the sensor cap 65 is rotatably mounted. The latter, for aesthetic reasons, is provided with depressions 651 evenly distributed along its circumference.

In FIG. 4, depressions 671 of the snap fastening 67, and in FIGS. 4 and 6, leaf springs 672 of the snap fastening 67 can be seen. By pressing the sensor cap 65 down toward the pipe 1 and then rotating it, the cap can be detached from the tubular portion 62. The ultrasonic transducer 64 thus becomes accessible and can be replaced if necessary.

Fixed approximately in the middle of the longitudinal center line 611 of the bracket 6 is a device 70 for tightening the strap 4, which is shown only in FIG. 5, but is not visible in FIGS. 4 and 6. The tightening device 70 has an axis 701 and comprises a spiral spring 71, which is accommodated in a spring housing 72. The latter is fixed in the bracket 6 on the longitudinal center line 611 by means of a threaded neck 74 having a central bore 73.

The tightening device 70 further comprises a nut 76 with a hexagonal or square head 761 which is rotatable in the spring housing 72 and which must be screwed onto the threaded stud 753 of FIG. 3 to tighten the strap 4, 4' or 5, 5'. The nut 76 and the spiral spring 71 are preferably undetachably held in the spring housing 72.

Figure 7:
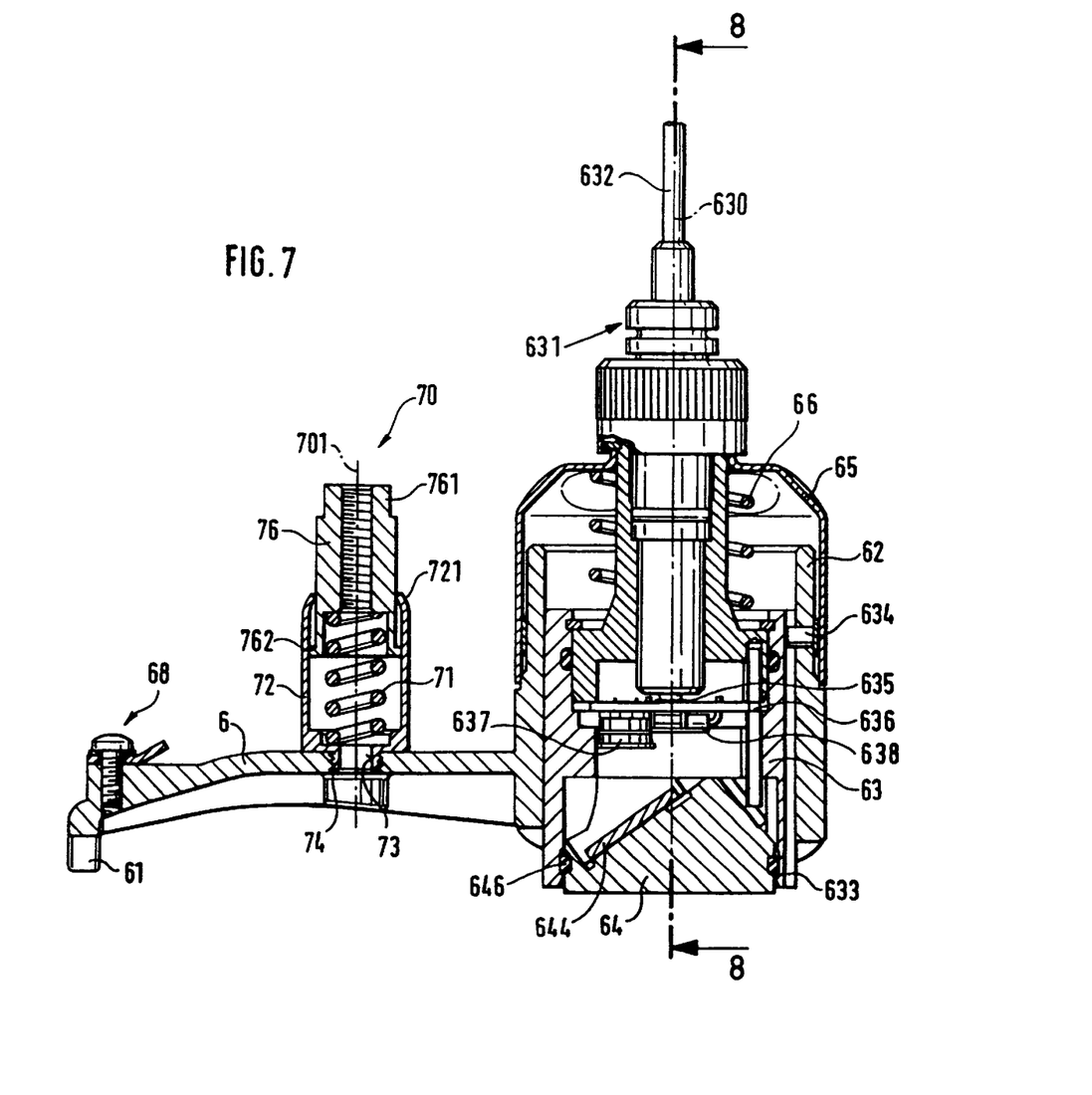
FIG. 7 is a longitudinal section taken along a center line of the bracket of another preferred embodiment of the sensor assembly of FIG. 4.

As shown in FIGS. 5 and 7, this can be achieved, for example, by providing the nut 76 at an inner end with a collar 762 and by flanging the spring housing 72 inwards at its end 721 facing the nut 76 after the spiral spring 71 and the nut 76 have been in-serted into the spring housing 72.

By turning the nut 76 on the threaded stud 753, the pre-tightened strap 4, 4' or 5, 5' is finally tightened and subjected to a constant mechanical pretension by means of the spiral spring 71. In this manner, temperature-induced changes in the length of the strap, which may occur in situ, can be fully compensated for, so that the straps cannot slacken.

In FIGS. 5 and 7, as in FIG. 1, it can be seen that a screw clamp-ing terminal 68 is provided at the end 61 of the bracket 6. It serves to connect a grounding or protective conductor.

Figure 9:
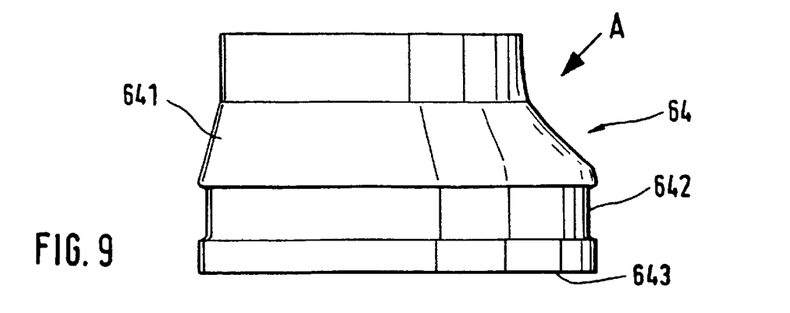
FIG. 9 is a side view of an ultrasonic transducer as used in the invention.
Figure 10:
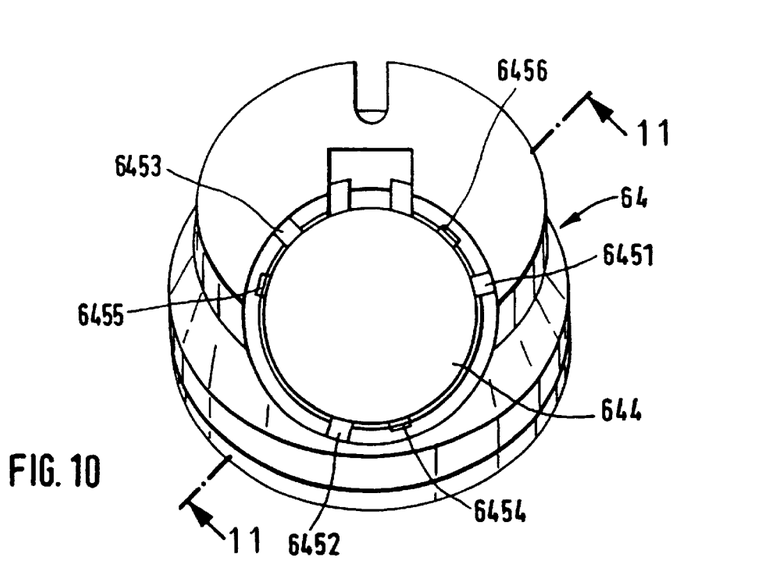
FIG. 10 is a perspective view of the ultrasonic transducer of FIG. 9 in the direction of arrow A.
Figure 11:
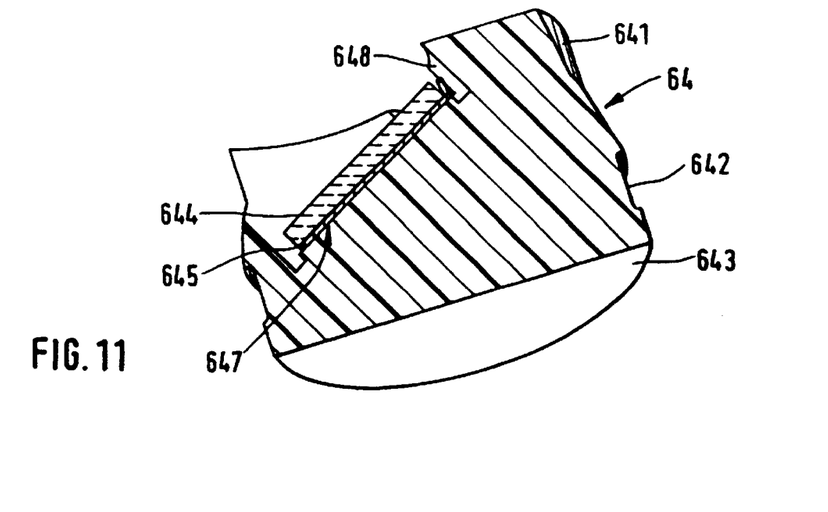
FIG. 11 is a perspective view of the ultrasonic transducer of FIGS. 9 and 10 in a section taken along line B—B of FIG. 10.

In FIGS. 9 to 11, the construction of the ultrasonic transducers used in the invention is shown in different views. In the side view of FIG. 7, a substrate 641 of the ultrasonic transducer 64 can be seen. This substrate has the shape of a circular cylinder and is made, for example, of a high-temperature thermoplastic material, such as a polyetherimide (PEI) as is obtainable under the trade name "Ultem 1000".

The substrate 641 is provided with an annular groove 642 for receiving an O ring 646, which is shown only in FIGS. 5 and 6. Furthermore, the substrate 641 has a plane bearing surface 643, which rests on the pipe 1, 1' in the strapped-on condition.

FIG. 10 is a perspective view of the ultrasonic transducer 64 of FIG. 9 in the direction of arrow A, and FIG. 11 is a perspective section taken along line B—B of FIG. 10.

A transducer element 644 is adhesive-bonded to the substrate 641 with the interposition of a metal disk 645. The transducer element 644 is disk-shaped and is made of a ceramic piezoelectric material, such as a PZT-5 standard soft ceramic. The metal disk 645 has a coefficient of thermal expansion between that of substrate 641 and that of transducer element 644.

The thickness of the metal disk 645 must not exceed one quarter of the wavelength of the ultrasound in the metal disk 645. The latter is preferably of pure aluminum, but it may also be of titanium, high-grade steel, brass, or lead, for example.

Particularly suitable adhesives are epoxy adhesives which have a glass transition temperature above the permissible operating temperature of the ultrasonic transducer 64. Such adhesives are obtainable, for example, from Ciba-Geigy, Basel, Switzerland, under the product designations AV8 and AV118.

The transducer element 644 and the metal disk 645 are bonded to the substrate 641 in a plane 647 inclined to the bearing surface 643. This plane 647 determines the bottom surface of an angular hole 648.

By means of three fingers 6451, 6452, 6453 spaced at approximately 120°, the metal disk 645 is designed to be self-centering with respect to the angular hole 648. By means of three lugs 6454, 6455, 6456 separated from the fingers 6451, 6452, 6453, respectively, and also spaced at approximately 120°, the metal disk 645 is designed to center the transducer element 644. The three lugs are bent out of the plane of the metal disk 645.

The metal disk allows the ultrasonic transducer 64, and thus the entire clamp-on flowmeter 10, 10', to be used in a wide temperature range without the joint between the transducer element and the substrate being destroyed under cyclic temperature stress. This is particularly important in the case of clamp-on flowmeters since the temperature of fluids flowing in the pipe 1, 1' may vary very widely.

The metal disk also permits the ultrasonic transducer to be operated over a wider bandwidth than an ultrasonic transducer without such a metal disk. Furthermore, the metal disk improves the acoustic matching between the transducer element and the substrate.

At this point, further details of FIGS. 5 to 8 should be added. FIGS. 5, 6 and FIGS. 7, 8 show two different preferred embodiments. The connecting cable 632 ends within the sensor in-set 63 in a plug 635 which is inserted into a socket. The latter is mounted on a small printed circuit board 636 to which the leads to the transducer element 644 are soldered. In the preferred embodiment shown in FIGS. 5 and 6, the printed circuit board 636 includes no further components.

Figure 8:
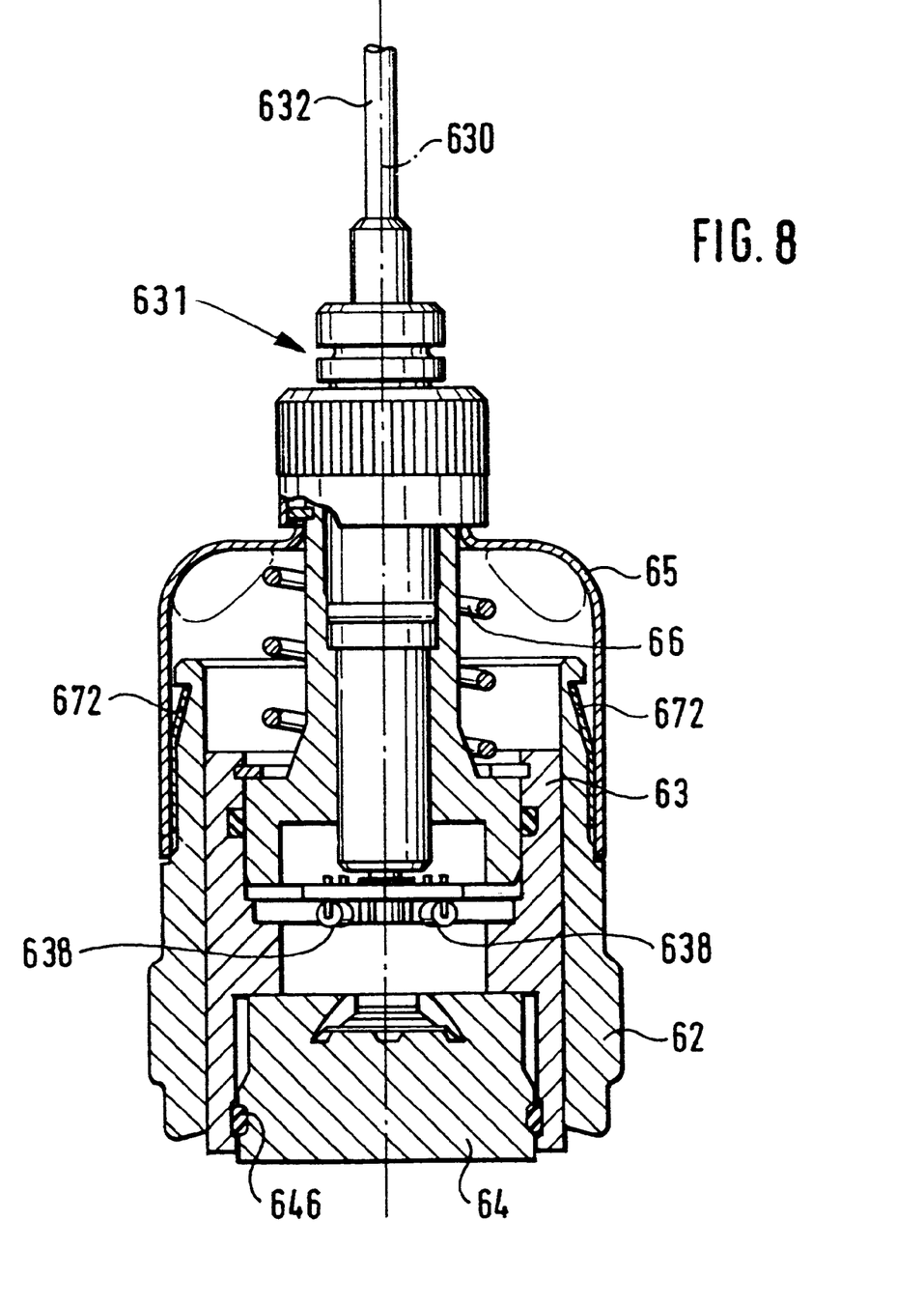
FIG. 8 is a section taken along line C—C of FIG. 7.

In the preferred embodiment shown in FIGS. 7 and 8, the printed circuit board 636 contains a series circuit which consists of an air-core coil 637 and resistors 638 and is electrically connected in parallel with the transducer element 644. Several such series circuits may be provided. With such a series circuit or such series circuits, it is possible in a surprisingly simple manner to meet explosion protect ion standards.

Figure 12:
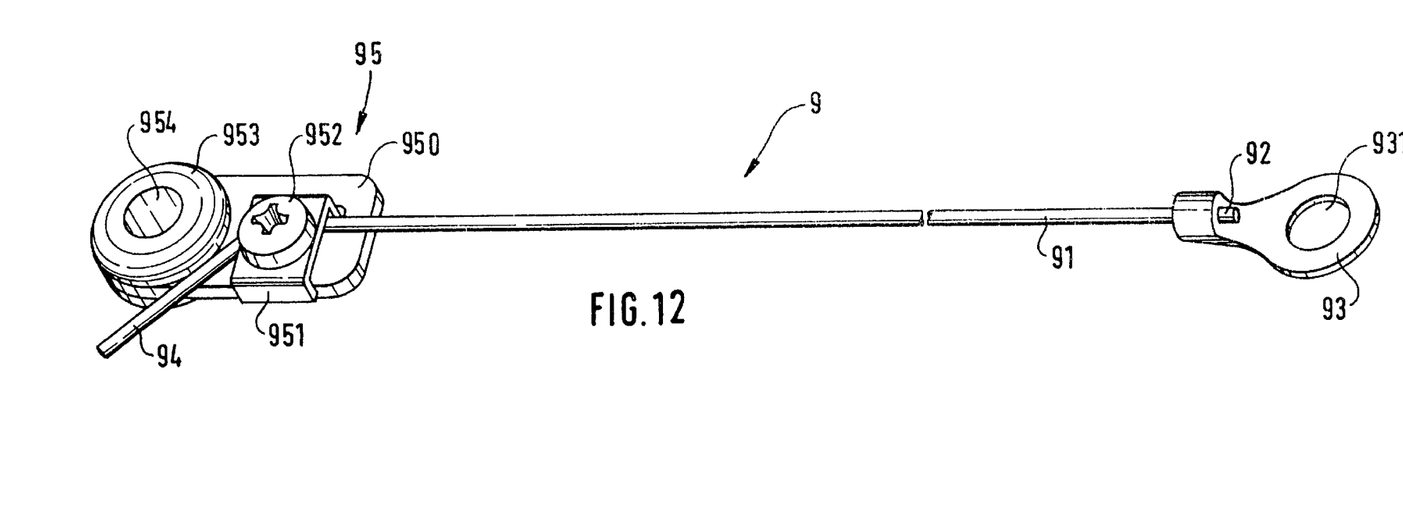
FIG. 12 is a perspective top view of a first mounting aid for precisely adjusting a clamp-on ultrasonic flowmeter as shown in FIG. 2.
Figure 13:
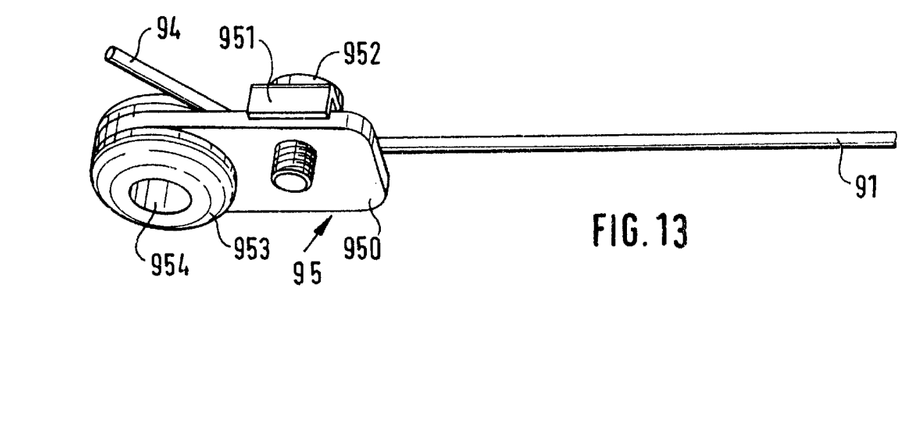
FIG. 13 is a perspective bottom view of a detail of FIG. 12.
Figure 14:
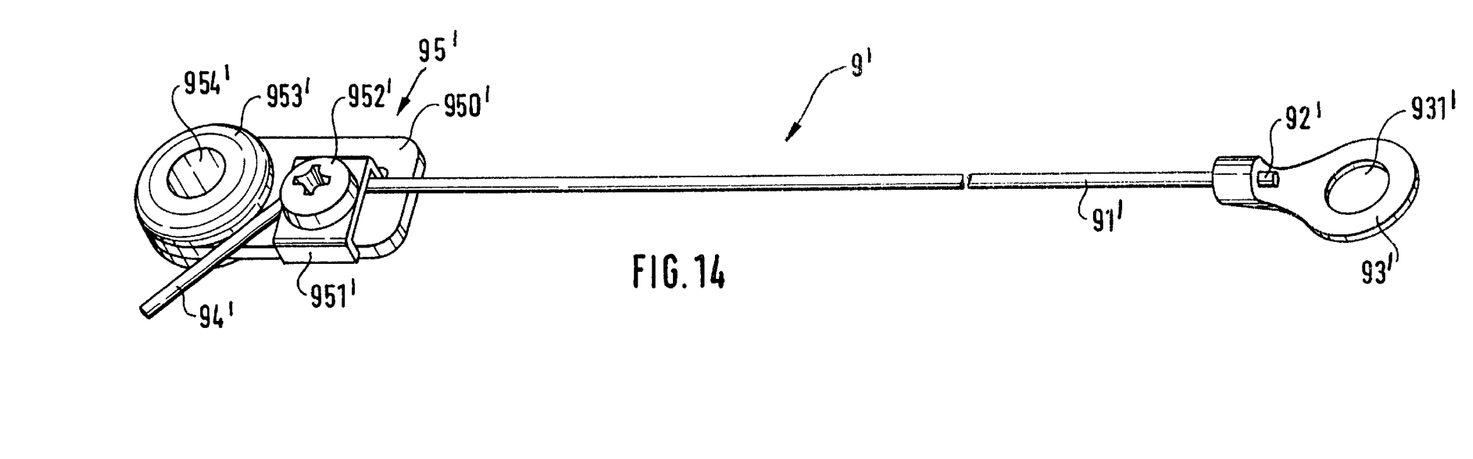
FIG. 14 is a perspective top view of a second mounting aid for precisely adjusting a clamp-on ultrasonic flowmeter as shown in FIG. 2.
Figure 15:
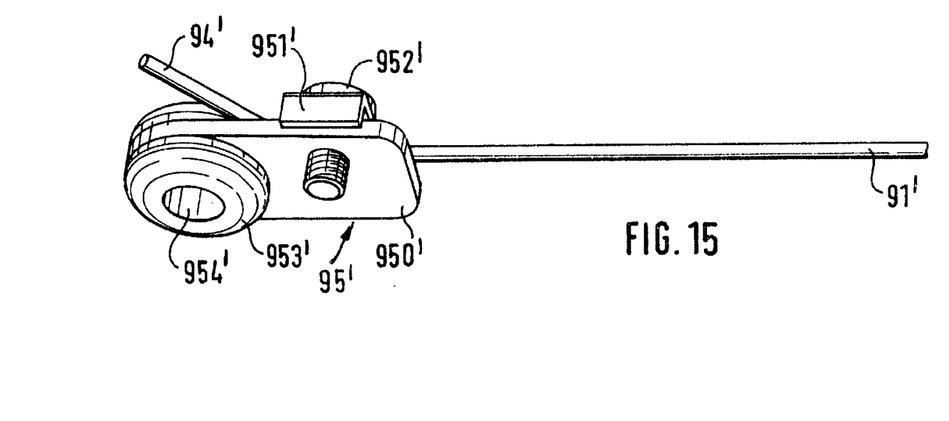
FIG. 15 is a perspective bottom view of a detail of FIG. 14.

FIGS. 12 and 14 show perspective top views of a first mounting aid 9 and a second mounting aid 9', respectively, for precisely adjusting the clamp-on flowmeter of FIG. 2. FIGS. 13 and 15 are respective perspective partial bottom views. By means of the mounting aids 9, 9', the sensor assemblies 2', 3' of FIG. 2 can be strapped on precisely along the two straight surface lines 11', 11", i.e., spaced exactly 180° apart, and fixed in this 180° position.

This is done by means of two preferably unstretchable cords, for example thin wire ropes, referred to in the following as a first rope section and a second rope section 91'. Of these, the first rope section 91 is shown in FIG. 12, and the second rope section 91' is shown in FIG. 14.

A first end 92 of the rope section 91 of FIG. 12 is permanently fixed, e.g., soldered or press-fitted, in a first rope eye 93. The hole 931 of the rope eye 93 has a diameter slightly greater than the diameter of the threaded stud 753 of FIG. 3, so that the rope eye 93 can be slipped over the stud 753 by applying slight pressure and removed therefrom by slight pulling.

A second end 94 of the rope section 91 can be fixed temporari-ly in a second rope eye 95; thus the length of the rope section 91 between the two rope eyes 93, 95 can be adjust-ed.

The rope eye 95 comprises a base plate 950, one end of which is provided with an eyelet 953 having a hole 954. The eyelet 953 is thicker than the base plate 950. The hole 954 has a diameter slightly greater than that of the threaded stud 753 of FIG. 3, so that the rope eye 95 can be slipped over the stud 753 by applying slight pressure and removed therefrom by slight pulling.

The end 94 of rope section 91 can be fixed by means of a clamping piece 951, which is pressed down by turning a screw 952 into the base plate 950. The clamping piece 951 is under the head of the screw 952.

A first end 92' of the rope section 91' of FIG. 14 is permanently fixed, e.g., soldered or press-fitted, in a first rope eye 93'. The hole 931' of the rope eye 93' has a diameter slightly greater than the diameter of the threaded stud 753 of FIG. 3, so that the rope eye 93' can be slipped over the stud 753 by applying slight pressure and removed therefrom by slight pulling.

A second end 94' of the rope section 91' can be fixed temporarily in a second rope eye 95'; thus the length of the rope section 91' between the two rope eyes 93', 95' can be adjusted.

The rope eye 95' comprises a base plate 950', one end of which is provided with an eyelet 953' having a hole 954'. The eyelet 953' is thicker than the base plate 950'. The hole 954' has a diameter slightly greater than that of the threaded stud 753 of FIG. 3, so that the rope eye 95' can be slipped over the stud 753 by applying slight pressure and removed therefrom by slight pulling.

The end 94' of rope section 91' can be fixed by means of a clamping piece 951', which is pressed down by turning a screw 952' into the base plate 950'. The clamping piece 951' is under the head of the screw 952'.

Before the sensor assemblies 2', 3' of FIG. 2 are adjusted relative to each other and fixed on the pipe of a given nominal diameter, the length L of each of the rope sections 91, 91' from the axis of the hole 931, 931' of the rope eyes 93, 93' to the axis of the hole 954, 954' of the rope eyes 95, 95', is calculated by the following formula:

$$L=(U^2/4+A^2)^{1/2} \tag{5}$$

where

U=circumference of the pipe 1',

A=distance between the axes 701 of the two strap-tightening devices 70 of the sensor assemblies 2', 3'.

For the purposes of the invention, the exact value of the distance A is assumed to have already been determined in a concrete application, and thus to be known. The distance A is dependent an several parameters, namely on the diameter of the pipe 1', the wall thickness of the pipe, the type of fluid to be measured, the temperature of the fluid, etc.

These parameters are known from the beginning or are measurable/determinable, and can therefore be processed, for example with a microprocessor into which they are entered, into the value of the distance A for a concrete application.

For example, the wall thickness of the pipe 1Æ and the type of fluid can be determined using conventional ultrasonic measuring techniques. Corresponding measuring arrangements may form part of the clamp-on flowmeter 10, 10'.

After the concrete value of the length L has been calculated, each of the two rope sections 91, 91' is adjusted to this value by clamping the end 94, 94' onto the base plate 950, 950' by means of the screw 952, 952' and the clamping piece 951, 951'.

Next, one of the tighteners 75, e.g., the tightener belonging to the sensor assembly 2', is prestrapped onto the pipe 1' by means of the strap 4' and fixed in position, as described above. The rope eye 93 of the rope section 91 and then the rope eye 93' of the rope section 91' are slipped over the threaded stud 753 of the tightener 75 down to the lower end of the stud 753.

Then, the other tightener, i.e. the one belonging to the sensor assembly 3' is prestrapped on by means of the strap 5'. The rope eye 95 of the rope section 91 and then the rope eye 95' of the rope section 91' are slipped over the associated threaded stud 753 down to the lower end of the stud.of this tightener.

When attaching the two rope sections 91, 91', care must be taken to ensure that one rope section runs around the pipe 1' from one threaded stud to the other on one side of the pipe, and the other rope section on the other side.

Next, the strap 5' is moved in the axial direction of the pipe 1' and simultaneously in the direction of the circumference of the pipe until the two rope sections 91, 91' are tightened. In that case, the two sensor assemblies 2', 3' are in the correct relative position and are spaced exactly 180° apart.

After that, the straps 4', 5' are finally tightened and the sensor assemblies 2', 3' are bolted in place by tightening the nuts 76, and thus finally strapped on. Then, the two screws 952, 952' and thus the clamping pieces 951, 951' are loosened, so that the two rope sections 91, 91' can be separated from the rope eyes 95, 95'. Finally, the rope eyes 93, 93', 95, 95', are removed. from the respective threaded studs.

What is claimed is:

1. A clamp-on ultrasonic flowmeter comprising a first sensor assembly and a second sensor assembly which are positioned at a given distance from each other
either along one straight surface line of a pipe conducting a fluid to be measured
or along a first straight surface line of the pipe and a diametrically opposed, second straight surface line, respectively, and attached by means of a first pipe strap and a second pipe strap, respectively, and wherein said first sensor assembly and said second sensor assembly are identical in construction and each comprise:

a flat bracket adjacent to the pipe and having a longitudinal center line and a tubular portion integrally formed thereon;

a sensor inset longitudinally guided in the tubular portion and containing an ultrasonic transducer with a transducer element;

a sensor cap which is put over the tubular portion, is secured to the tubular portion by means of a snap fastening releasable by rotation, and comprises a spring which forces the sensor inset against the pipe; and a strap-tightening device fixed in the bracket approximately in the middle of the longitudinal center axis thereof.

2. The clamp-on ultrasonic flowmeter as claimed in claim 1 wherein the sensor inset ends in a cable pipe, and the sensor cap is rotatably mounted on the cable pipe.

3. The clamp-on ultrasonic flowmeter as claimed in claim 1 wherein the strap-tightening device comprises:

a spiral spring;

a spring housing mounted in the bracket on the longitudinal center axis thereof by means of a threaded neck having a central hole;

a tightener having a first end serving as a strap guide through which the strap runs, and a second end designed as a threaded stud; and a nut rotatable in the spring housing and screwed onto the threaded stud for tightening the strap.

4. The clamp-on ultrasonic flowmeter as claimed in claim 2 wherein the strap-tightening device comprises:

a spiral spring;

a spring housing mounted in the bracket on the longitudinal center axis thereof by means of a threaded neck having a central hole;

a tightener having a first end serving as a strap guide through which the strap runs, and a second end designed as a threaded stud; and a nut rotatable in the spring housing and screwed onto the threaded stud for tightening the strap.

5. The clamp-on ultrasonic flowmeter as claimed in claim 1 wherein at least one series circuit consisting of an air-core coil and at least one resistor is disposed within the sensor inset near the ultrasonic transducer, and is connected in parallel with the transducer element.

6. The clamp-on ultrasonic flowmeter as claimed in claim 2 wherein at least one series circuit consisting of an air-core coil and at least one resistor is disposed within the sensor inset near the ultrasonic transducer, and is connected in parallel with the transducer element.

7. The clamp-on ultrasonic flowmeter as claimed in claim 3 wherein at least one series circuit consisting of an air-core coil and at least one resistor is disposed within the sensor inset near the ultrasonic transducer, and is connected in parallel with the transducer element.

8. The clamp-on ultrasonic flowmeter as claimed in claim 4 wherein at least one series circuit consisting of an air-core coil and at least one resistor is disposed within the sensor inset near the ultrasonic transducer, and is connected in parallel with the transducer element.

\* \* \* \* \*

UNITED STATES PATENT AND TRADEMARK OFFICE
CERTIFICATE OF CORRECTION

| | | |
|---|---|---|
| PATENT NO. | : 6,397,683 B1 | Page 1 of 1 |
| DATED | : June 4, 2002 | |
| INVENTOR(S) | : Heinerich Hagenmeyer, Peter Schwarzenberger, Thierry Moser, Marcel von Arx, Walter Kamber and Sergej Lopatin | |

It is certified that error appears in the above-identified patent and that said Letters Patent is hereby corrected as shown below:

<u>Title page,</u>
Item [73], add the following Assignee: -- Endress + Hauser Flowtec AG --

Signed and Sealed this

Twentieth Day of August, 2002

*Attest:*

JAMES E. ROGAN
*Attesting Officer*   *Director of the United States Patent and Trademark Office*